US010501977B2

(12) United States Patent
Snider et al.

(10) Patent No.: US 10,501,977 B2
(45) Date of Patent: Dec. 10, 2019

(54) DUAL SLIDER WINDOW ASSEMBLY

(71) Applicant: MAGNA MIRRORS OF AMERICA, INC., Holland, MI (US)

(72) Inventors: Darin J. Snider, Holland, MI (US); Peggy L. Gustafson, Holland, MI (US); R. Scott Repp, Holland, MI (US)

(73) Assignee: MAGNA MIRRORS OF AMERICA, INC., Holland, MI (US)

(*) Notice: Subject to any disclaimer, the term of this patent is extended or adjusted under 35 U.S.C. 154(b) by 208 days.

(21) Appl. No.: 15/617,215

(22) Filed: Jun. 8, 2017

(65) Prior Publication Data
US 2017/0356231 A1 Dec. 14, 2017

Related U.S. Application Data

(60) Provisional application No. 62/347,835, filed on Jun. 9, 2016.

(51) Int. Cl.
*E05F 15/655* (2015.01)
*E05F 15/652* (2015.01)
*B60J 1/18* (2006.01)
*B62D 33/02* (2006.01)
*E05F 15/635* (2015.01)

(52) U.S. Cl.
CPC ........... *E05F 15/655* (2015.01); *B60J 1/1853* (2013.01); *B62D 33/02* (2013.01); *E05F 15/635* (2015.01); *E05F 15/652* (2015.01); *E05Y 2900/55* (2013.01)

(58) Field of Classification Search
None
See application file for complete search history.

(56) References Cited

U.S. PATENT DOCUMENTS

| 4,635,398 | A | * | 1/1987 | Nakamura | B60J 1/1853 49/370 |
| 4,920,698 | A | | 5/1990 | Friese et al. | |
| 4,995,195 | A | * | 2/1991 | Olberding | B60J 1/1853 49/118 |
| 5,146,712 | A | | 9/1992 | Hlavaty | |
| 5,531,046 | A | | 7/1996 | Kollar et al. | |
| 5,572,376 | A | | 11/1996 | Pace | |

(Continued)

FOREIGN PATENT DOCUMENTS

DE 19527746 C1 * 6/1996 ............ B60J 7/0573
EP 1932993 A1 * 6/2008 ............ E05F 15/619

*Primary Examiner* — Marcus Menezes
(74) *Attorney, Agent, or Firm* — Honigman LLP

(57) ABSTRACT

A rear slider window assembly for a vehicle includes an upper rail and a lower rail, with a fixed window panel having at least one glass panel having an inner surface and an outer surface and an opening between opposite side panel portions of the fixed window panel. The upper rail is attached at the inner surface of the fixed window panel at an upper region of the fixed window panel and above the opening. The lower rail is attached at the inner surface of the fixed window panel at a lower region of the fixed window panel and below the opening. First and second movable window panels are movable along the upper and lower rails between a closed position, where the movable window panels cooperate to close the opening, and an opened position, where both movable panels move away from one another to open the opening.

15 Claims, 16 Drawing Sheets

(56) References Cited

U.S. PATENT DOCUMENTS

| | | | |
|---|---|---|---|
| 5,853,895 A | 12/1998 | Lewno | |
| 6,038,819 A * | 3/2000 | Klein | B60J 1/1853 49/362 |
| 6,068,719 A | 5/2000 | Lewno | |
| 6,119,401 A * | 9/2000 | Lin | B60J 1/1853 49/118 |
| 6,691,464 B2 | 2/2004 | Nestell et al. | |
| 6,846,039 B2 | 1/2005 | Lewno | |
| 6,955,009 B2 * | 10/2005 | Rasmussen | B60J 1/1853 49/118 |
| 7,003,916 B2 | 2/2006 | Nestell et al. | |
| 7,073,293 B2 * | 7/2006 | Galer | B60J 1/1853 49/360 |
| 7,838,115 B2 | 11/2010 | Lewno | |
| 8,151,519 B2 * | 4/2012 | Bello | E05F 15/643 49/116 |
| 8,322,073 B2 | 12/2012 | Lewno | |
| 8,402,695 B2 | 3/2013 | Smith et al. | |
| 8,881,458 B2 | 11/2014 | Snider et al. | |
| 8,915,018 B2 | 12/2014 | Snider | |
| 9,475,370 B2 * | 10/2016 | Snider | B60J 7/053 |
| 9,579,955 B2 * | 2/2017 | Snider | B60J 1/1853 |
| 2003/0213179 A1 | 11/2003 | Galer | |
| 2004/0020131 A1 | 2/2004 | Galer et al. | |
| 2006/0011311 A1 * | 1/2006 | Petridis | E05F 17/004 160/196.1 |
| 2006/0107600 A1 | 5/2006 | Nestell et al. | |
| 2008/0127563 A1 * | 6/2008 | Tooker | E05F 11/535 49/349 |
| 2009/0266185 A1 * | 10/2009 | Harie | E05F 17/004 74/29 |
| 2010/0263290 A1 * | 10/2010 | Pawloski | E05F 15/635 49/413 |
| 2011/0056140 A1 | 3/2011 | Lewno | |
| 2013/0174488 A1 * | 7/2013 | Snider | B60J 1/1853 49/70 |
| 2015/0101254 A1 * | 4/2015 | Tooker | B60J 1/1853 49/413 |

* cited by examiner

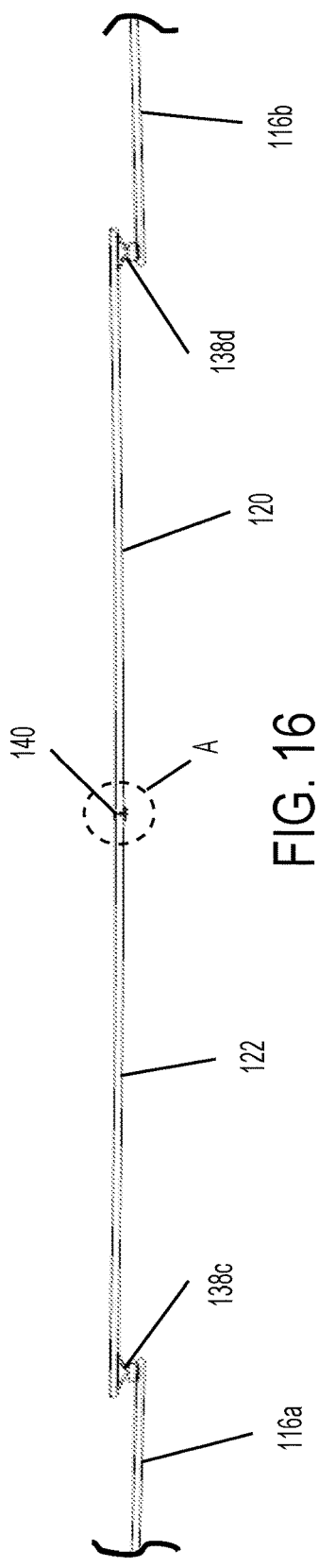
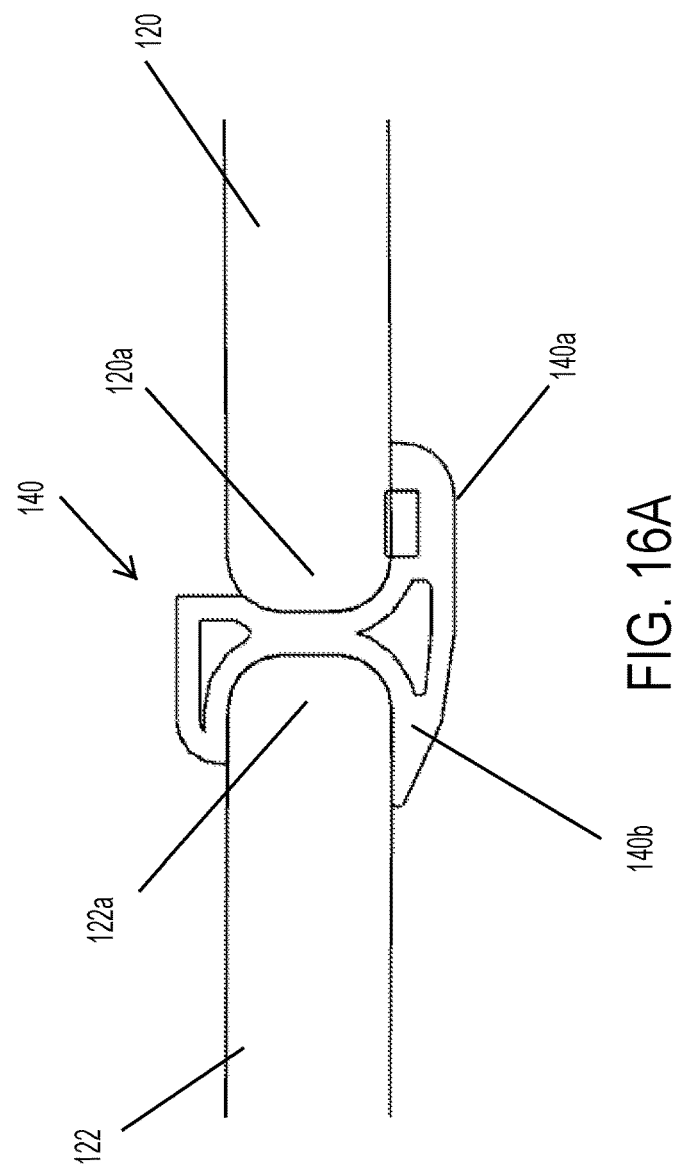

DUAL SLIDER WINDOW ASSEMBLY

CROSS REFERENCE TO RELATED APPLICATION

The present application claims the filing benefits of U.S. provisional application Ser. No. 62/347,835, filed Jun. 9, 2016, which is hereby incorporated herein by reference in its entirety.

FIELD OF THE INVENTION

The present invention relates to movable or slider window assemblies for vehicles and, more particularly to a side or rear slider window assembly for a vehicle.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three panels, such as two fixed window panels and a slidable window panel. The slidable window panel is supported by rails and may be moved along the rails to open and close the window.

SUMMARY OF THE INVENTION

The present invention provides a rear slider window assembly that has two movable window panels movable relative to one or more fixed window panels, with the movable panels moving along upper and lower rails or channels attached at the fixed window panel or panels. The movable panels are movably driven by a drive system that moves the panels in tandem, such that the movable panels open and close together. The rear slider window assembly thus provides for a larger central opening than may be achieved with a single movable window panel.

These and other objects, advantages, purposes and features of the present invention will become apparent upon review of the following specification in conjunction with the drawings.

BRIEF DESCRIPTION OF THE DRAWINGS

FIG. 16 is a section view taken along the line XVI-XVI in FIG. 7; and

FIG. 16A is an enlarged sectional view of the seal at the region A of FIG. 16.

DESCRIPTION OF THE PREFERRED EMBODIMENTS

Figure 1:
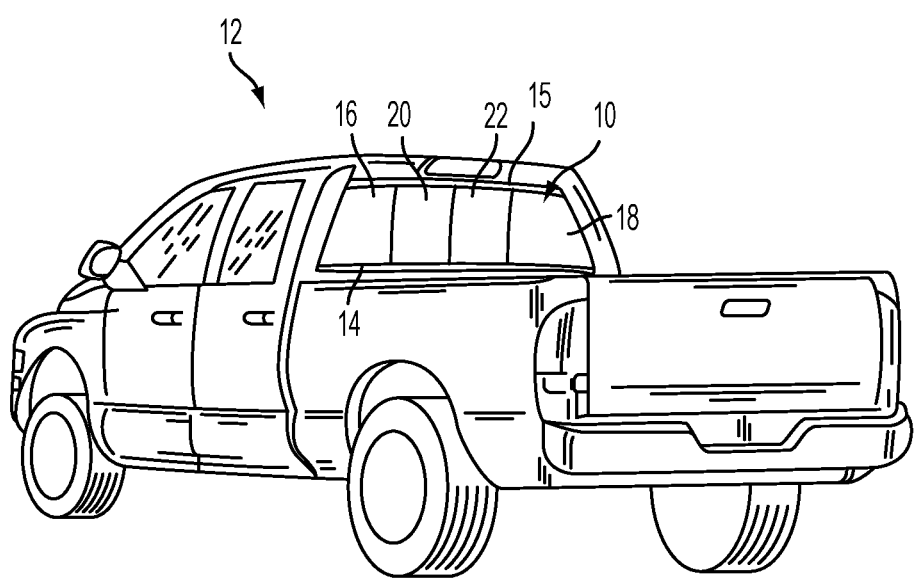
FIG. 1 is a rear perspective view of a pickup truck having a rear slider window assembly in accordance with the present invention.

Referring now to the drawings and the illustrative embodiments depicted therein, a rear slider window assembly 10 of a vehicle 12 (such as a pickup truck or the like) includes a window frame having a lower channel portion or rail 14 and an upper channel portion or rail 15, a pair of side fixed window panels 16, 18 and a pair of movable window panels 20, 22 that are movable relative to the frame and fixed window panels 16, 18 between an opened position and a closed position (FIGS. 1-4). The lower channel portion or rail 14 and upper channel portion or rail 15 are disposed at and along inner surfaces (FIG. 4) of fixed window panels 16, 18 to facilitate sliding of movable window panels 20, 22 horizontally across window assembly 10 between the opened and closed positions.

The fixed side window panels 16, 18 may be two separate side window panels 16, 18 that are spaced apart so as to define an opening therebetween (such as shown in FIG. 1), or may be part of a single fixed window panel with an aperture or opening 17 (FIGS. 2-4) formed between the side panels or portions 16, 18. Slider or movable window panels 20, 22 are movable along lower rail 14 and upper rail 15 to open and close the opening, as discussed below.

The movable panels thus move along the rails or channels and may engage respective seals or seal portions at the periphery of the aperture of the fixed window panel. One or both of the movable panels may have a sealing element at its inboard perimeter edge region so that the two movable panels seal together when closed. The movable panels may include a blackout or frit layer about their peripheries to conceal any sealing elements and/or electrical connections at the movable panels. Similarly, the fixed panel or panels may include a blackout or frit layer about the periphery or peripheries and about the aperture to conceal sealing elements and/or electrical connections and/or the rails or channels and/or the like.

Optionally, each of the slider window panels 20, 22 may be disposed at or be attached to or may include a lower carrier at the lower perimeter edge region of the slider window panel and that is slidably or movably received in the lower rail 14 of the frame portion. The movable or slider window panels 20, 22 may be movable such as via manual pushing or pulling at the window panel or in response to actuation of a drive motor 24 of a drive motor assembly or system 26 that is operable to impart horizontal movement of the slider window panels 20, 22 along the rails 14, 15.

Figure 3:
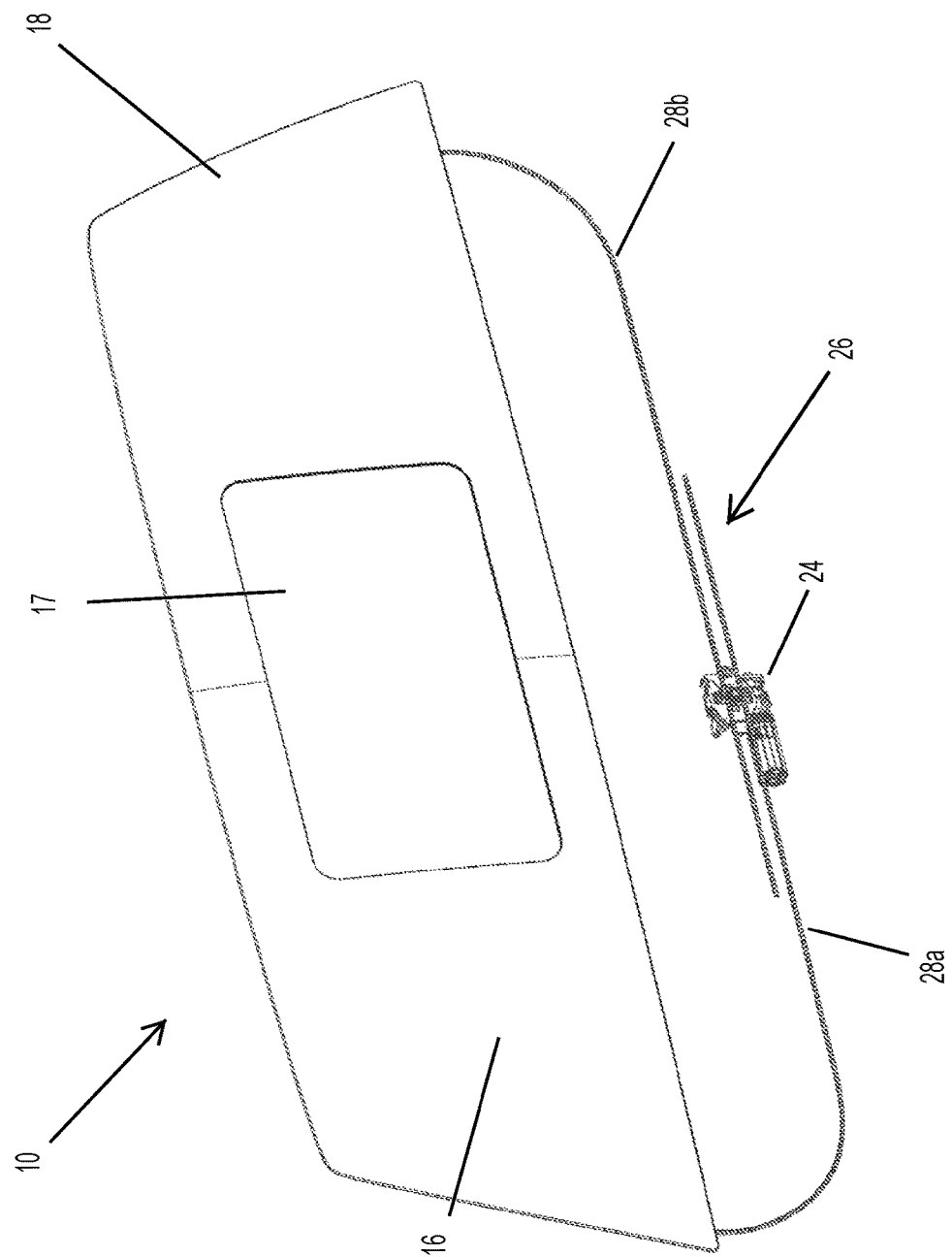
FIG. 3 is a rear perspective view of the rear slider window assembly of FIG. 2, shown in an opened state.
Figure 4:
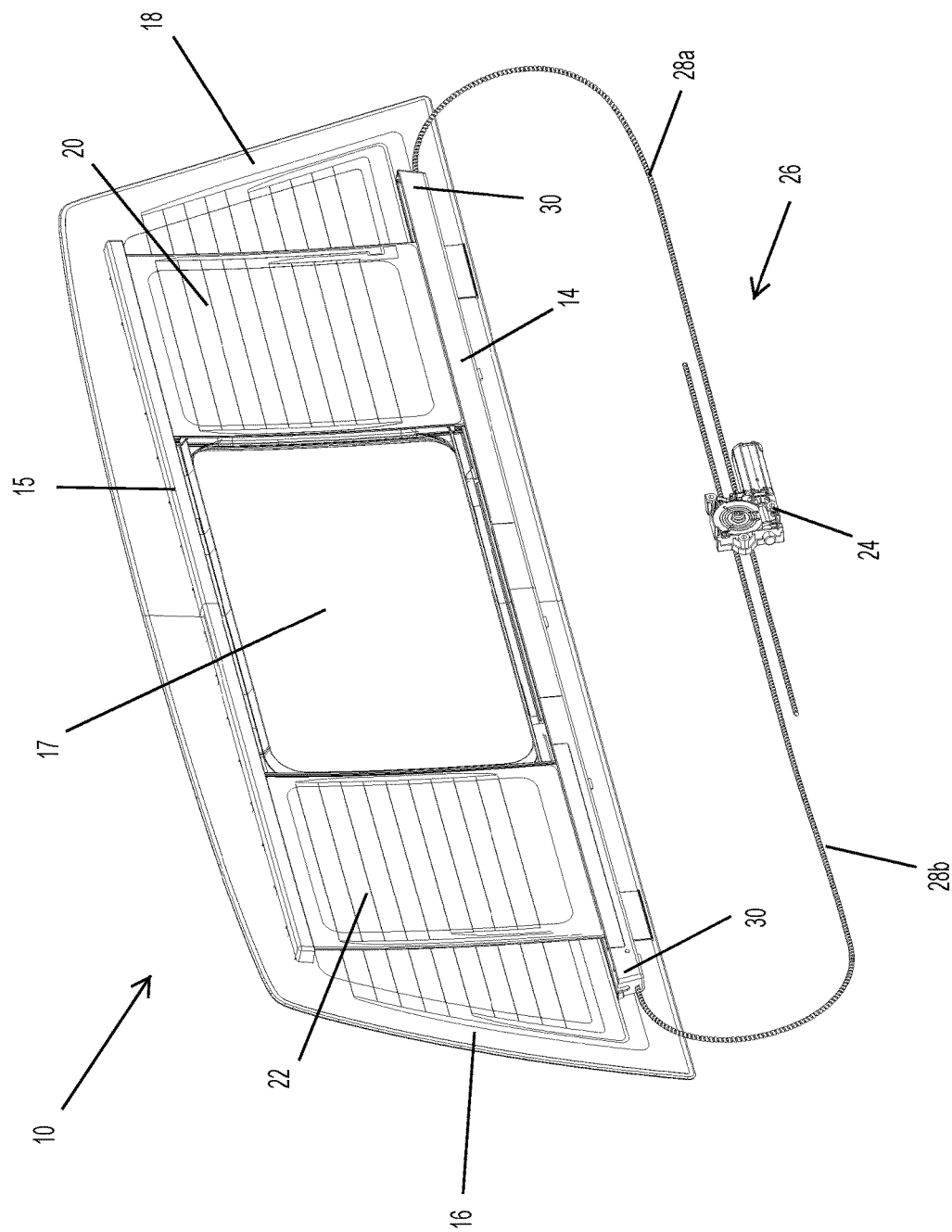
FIG. 4 is a front perspective view of the rear slider window assembly of FIG. 3, shown with heater grids on the fixed and movable panels.
Figure 5:
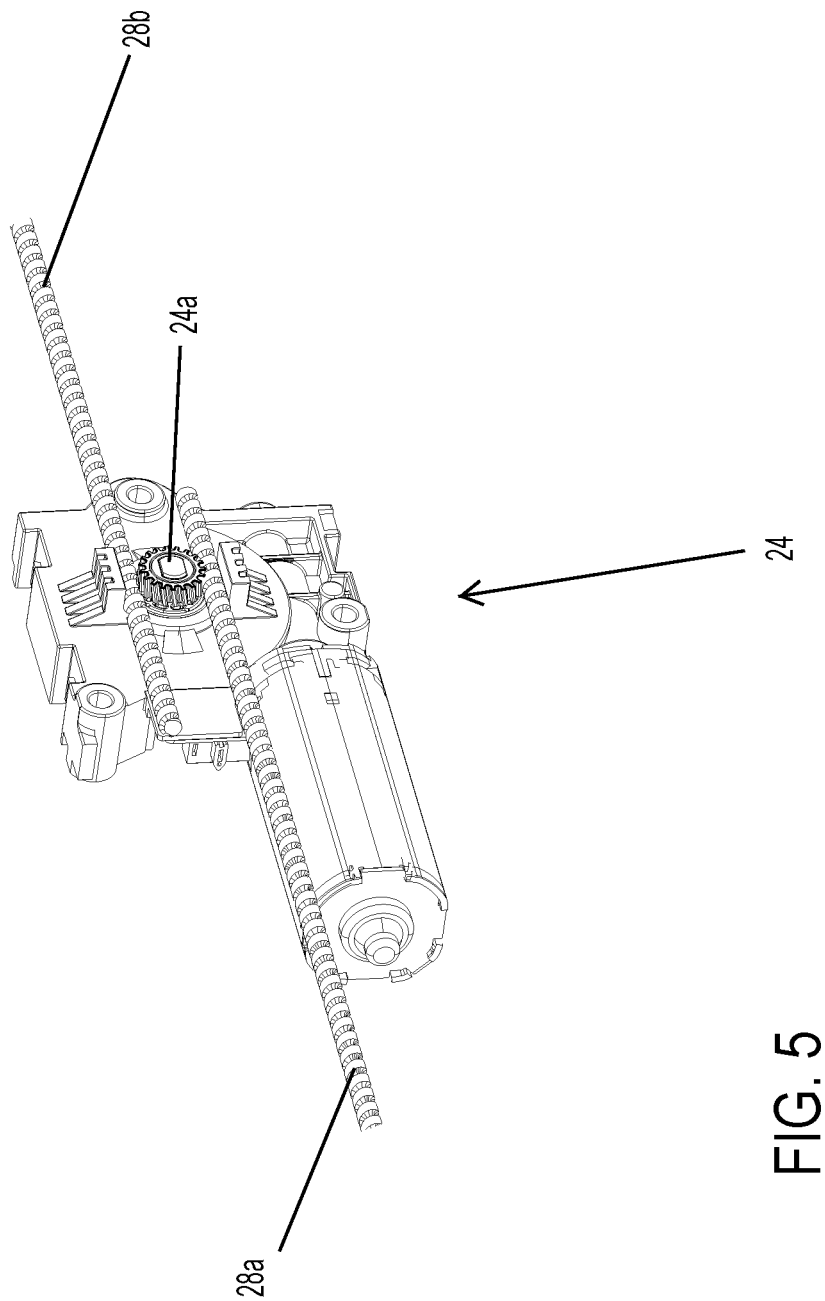
FIG. 5 is a perspective view of a drive motor for driving helical elements to open and close the window panels.

In the illustrated embodiment, and such as can be seen with reference to FIGS. 3-5, the drive system 26 comprises drive motor 24, which is operable to rotatably drive a common gear element 24a to drive or move a pair of helical drive elements 28a, 28b to move the window panels in either direction. The helical drive elements or elongated helical cables or elements 28a, 28b are disposed at least partially along a respective side or end region of the lower rail 14 and routed to and through the motor-gear assembly, and the movable panels 20, 22 are attached at the elements 28a, 28b, respectively, with one or more connectors or end stops or guides 30 disposed at the rail 14 to receive and guide the respective helical element (or cable or other type of connector attached at the ends of the helical elements). The connectors 30 guide the respective helical elements 28a, 28b, which are attached at an end of the respective movable window panel 20, 22 so that the movable window panels move with the helical elements as the helical elements are driven or moved via rotational driving of the motor and are moved in one direction or the other depending on the rotational drive direction of the motor and gear.

The helical cables are sufficiently rigid or stiff so as to allow them to push and pull at the movable window panels to close and open the window when the gear of the drive motor is rotated and engaging with the grooves or ribs of the helical cables, yet the helical cables are flexible to flex as they follow the curved path between the drive motor and the guides or connectors 30. Optionally, one or more additional curved guides may be provided to guide the cables as they curve or flex about 180 degrees from where they exit the drive motor to where they enter the respective guide or connector. The helical cables and drive motor are configured such that rotatably driving of the common gear in one direction causes both helical elements to move in opposite directions so as to open the respective movable window panels together or in tandem or to close the respective movable window panels in tandem.

Figure 2:
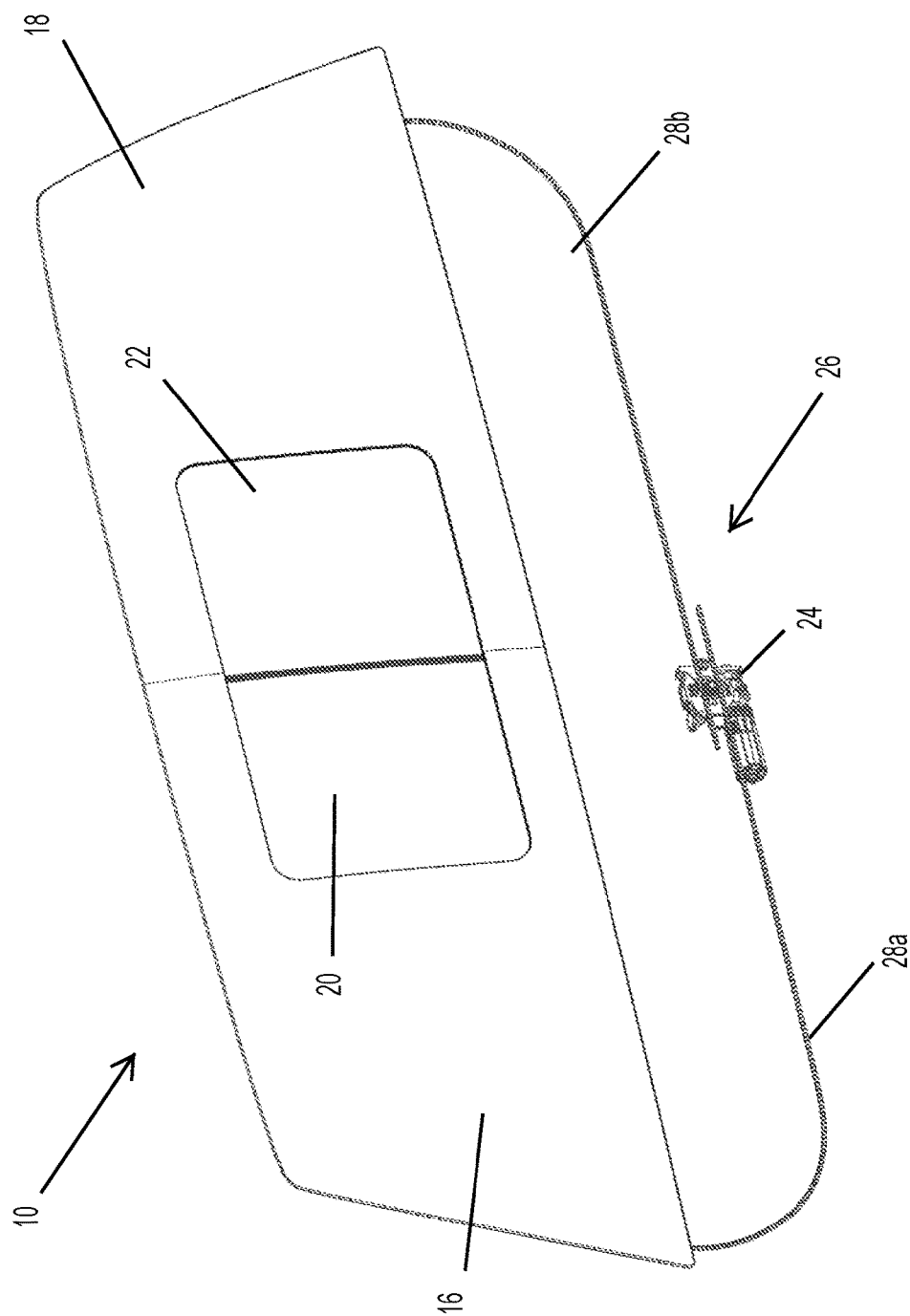
FIG. 2 is a rear perspective view of the rear slider window assembly of the present invention, shown in a closed state.

The movable element or connector or guide may comprise a molded plastic element having a receiving portion that receives the helical element (or cable end) therethrough. Thus, when the helical element is rotatably driven or rotated (such as responsive to a user input or switch or button in the cabin of the vehicle) to move the helical element relative to the motor and relative to the fixed window panel and channel, the connector moves with the helical element and moves the respective movable window panel along the rails or channels 14, 15. Because the drive motor 24 rotatably drives a common gear 24a, which drives the helical elements 28a, 28b together, the movable window panels 20, 22 move in tandem between their respective opened position (FIGS. 3 and 4) and closed positions (FIGS. 1 and 2). Thus, when the motor is operated to rotatably drive the gear element in one direction (such as clockwise in FIG. 5), the helical elements are pulled or drawn toward the motor and the window panels 20, 22 are opened in tandem, and when the motor is operated to rotatably drive the gear element in the other direction, the helical elements are pushed or moved away from the motor and the window panels 20, 22 are closed in tandem. The helical elements and drive system may utilize aspects of the drive systems described in U.S. Pat. No. 9,475,370, which is hereby incorporated herein by reference in its entirety. The helical elements may comprise a helical groove therealong for the teeth of the drive gear 24a to engage, or the elements may comprise segmented elements with spaced apart individual notches or grooves or channels for the teeth of the drive gear to engage.

Optionally, the fixed window panels and movable window panels may include one or more electrically conductive elements, such as heater grids or the like (such as shown in FIG. 4), which may be powered utilizing aspects of the window assemblies described in U.S. Pat. Nos. 8,881,458 and/or 8,402,695, which are hereby incorporated herein by reference in their entireties. For example, a flexible electrical connector may electrically connect between a heater grid at a respective fixed panel and a heater grid of the respective movable window panel. The electrical connectors may power the heater grids of the movable window panels irrespective of whether the window panels are opened or closed.

Figure 6:
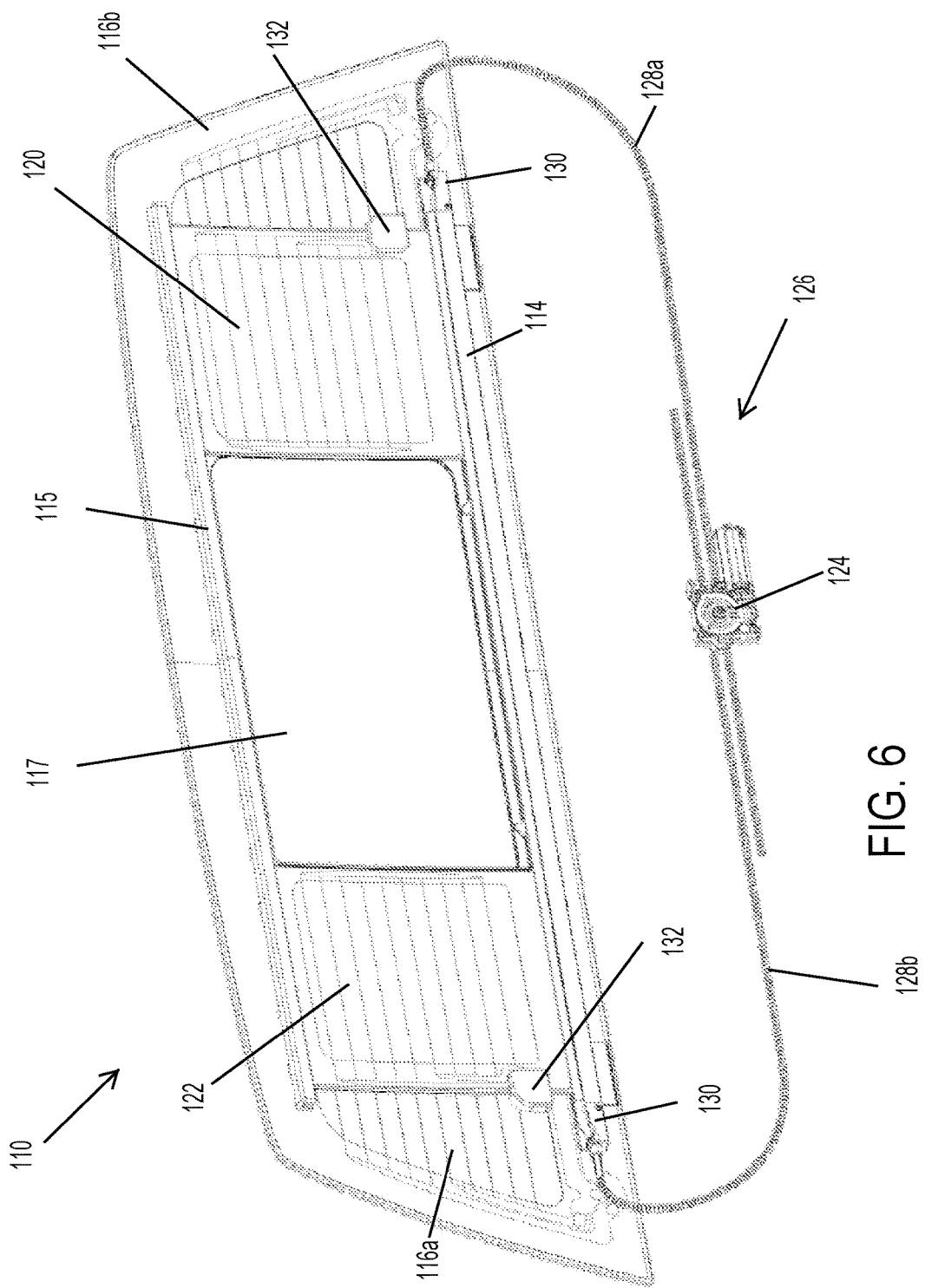
FIG. 6 is a rear perspective view of another rear slider window assembly of the present invention, shown in an opened state.
Figure 7:
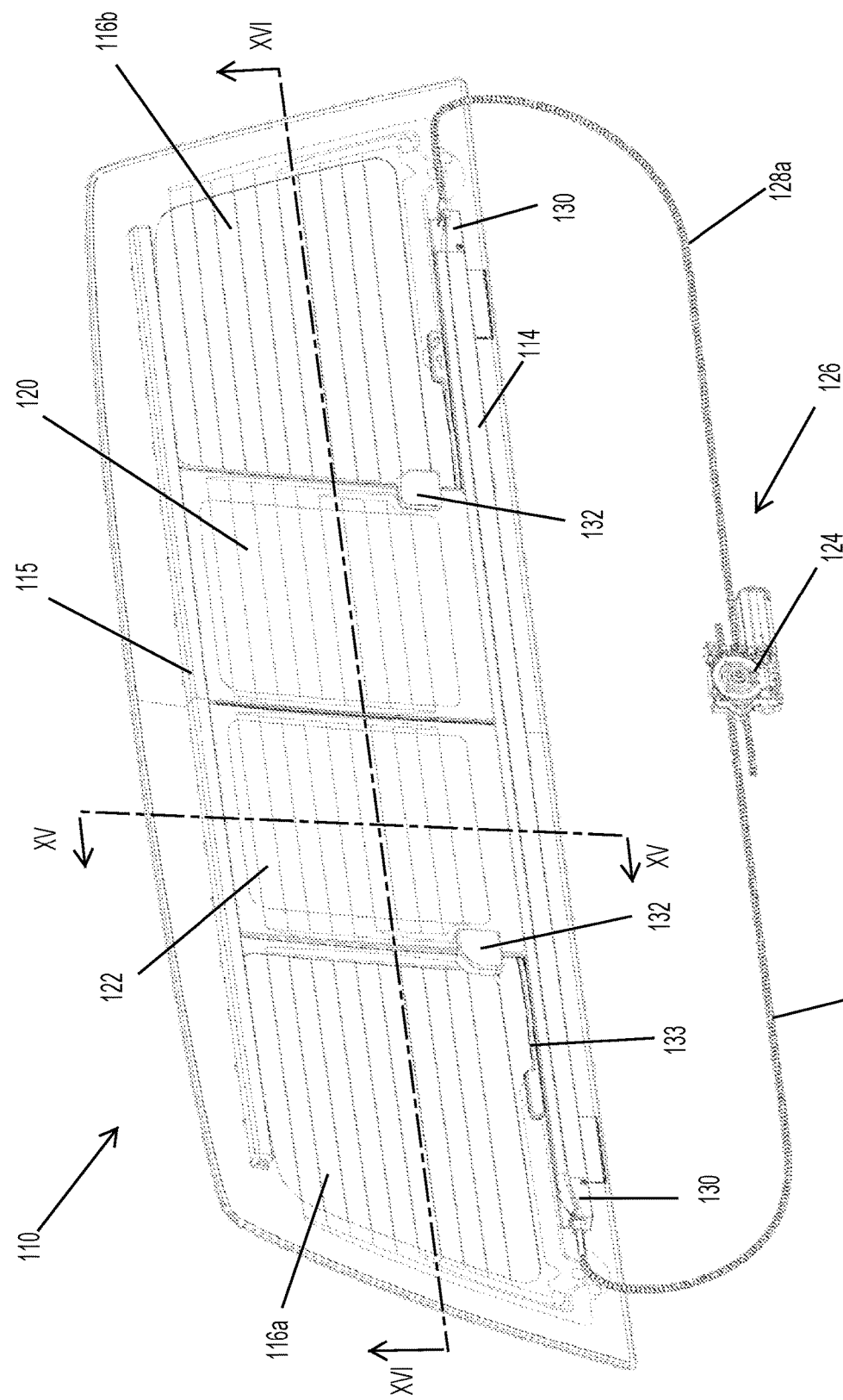
FIG. 7 is another rear perspective view of the rear slider window assembly of FIG. 6, shown in a closed state.

Referring now to FIGS. 6-13, a rear slider window assembly 110 includes a window frame having a lower channel portion or rail 114 and an upper channel portion or rail 115, a pair of side fixed window panels 116a, 116b and a pair of movable window panels 120, 122 that are movable relative to the frame and fixed window panels 116a, 116b between an opened position and a closed position (FIGS. 6 and 7). The lower channel portion or rail 114 and upper channel portion or rail 115 are disposed at and along inner surfaces of fixed window panels 116a, 116b to facilitate sliding of movable window panels 120, 122 horizontally across window assembly 110 between the opened and closed positions, such as in a similar manner as discussed above with respect to FIGS. 1-5. In the illustrated embodiment, the fixed window panels 116a, 116b comprise opposite panel portions of a single window panel 116 having an opening 117 formed therethrough, with an upper portion 116c of the window panel above the opening and a lower portion 116d of the window panel below the opening.

As shown in FIGS. 6 and 7, the fixed window panel or panels 116a, 116b have a heater grid disposed thereat, and the movable window panels 120, 122 also have a heater grid disposed thereat. The heater grids of the movable window panels are powered via an electrical connector 132 and flexible wire or cable 133 that electrically connects the heater grids of the movable window panels with the heater grids of the fixed window panel throughout the range of motion of the movable window panels and irrespective of whether or not the movable window panels are opened or closed. The electrical connection of the heater grids may utilize aspects of the window assemblies described in U.S. Pat. Nos. 9,579,955; 8,881,458 and/or 8,402,695, which are hereby incorporated herein by reference in their entireties.

The drive system 126 comprises drive motor 124, which is operable to drive or move the helical drive elements or elongated drive elements 128a, 128b to move the respective window panels 120, 122. The helical drive elements or elongated helical cables or elements 128a, 128b are disposed at least partially along a respect side or end region of the lower rail 114 and routed to and through the motor-gear assembly, and the movable panels 120, 122 are movably attached at the elements 128a, 128b, respectively, such as via one or more connectors 130 disposed at the rail 114 to receive the respective helical element (or cable or other type of connector attached at the ends of the helical elements). The connectors 130 guide the respective helical elements 128a, 128b, which are attached at an end of the respective movable window panel 120, 122 so that the movable window panels move with the helical elements as the helical elements are rotatably driven via the motor and are moved in one direction or the other depending on the rotational drive direction of the motor and gear.

In the illustrated embodiment, the connectors 130 comprise a base portion 130a and an upper portion 130b which is fastened (such as via one or more fasteners or screws 130c) to the base portion 130a with the helical element 128a, 128b disposed in and along a channel or passageway formed by the upper portion 130b and base portion 130a when assembled together. The base portion 130a is configured to attach at a mounting or attaching portion 114a of the channel or rail 114. For example, the base portion may receive a protruding attaching portion 114a and may be secured relative to the attaching portion via a fastener or screw 114b that is threaded or received into and through a bore or hole 130d of the base portion 130a.

Figure 11:
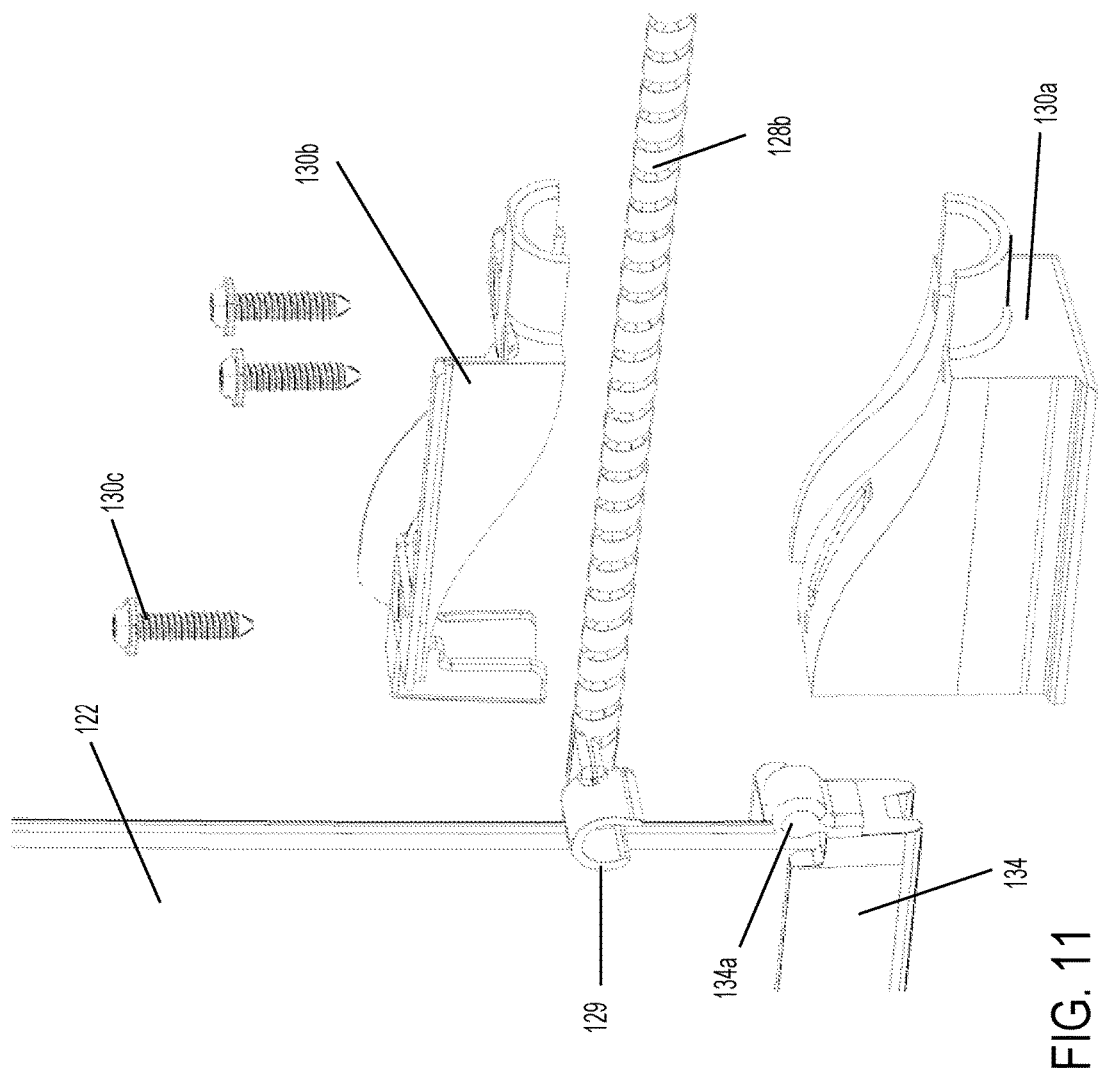
FIG. 11 is another exploded perspective view of the end stop and cable guide and movable window panel of the rear slider window assembly.

The end 129 of the helical element is configured to attach to a connecting element 134a of a carrier 134 of the respective movable window panel 120, 122, such that movement of the end 129 of the helical element relative to the connector 130 imparts corresponding movement of the respective movable window panel relative to the connector and along the rail 114. In the illustrated embodiment, the end 129 comprises a cylindrical receiving element (as best shown in FIG. 11) that receives the cylindrical element 134a at the end of the carrier 134 to attach the helical element to the carrier 134 for moving the movable window panel and carrier along the lower rail 114.

Figure 8:
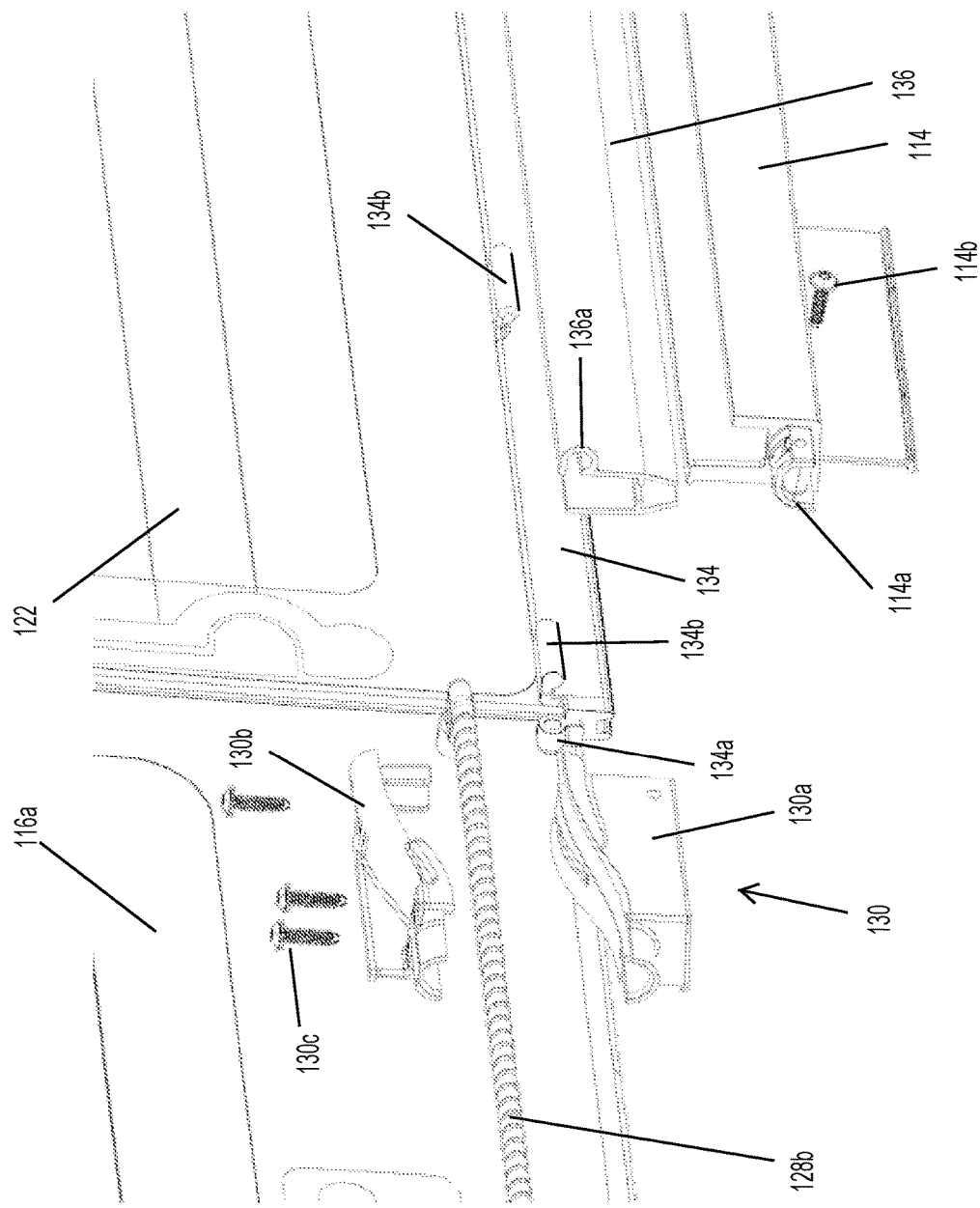
FIG. 8 is an exploded perspective view of the channel, end stop, cable and movable window panel of the rear slider window assembly of FIGS. 6 and 7.
Figure 9:
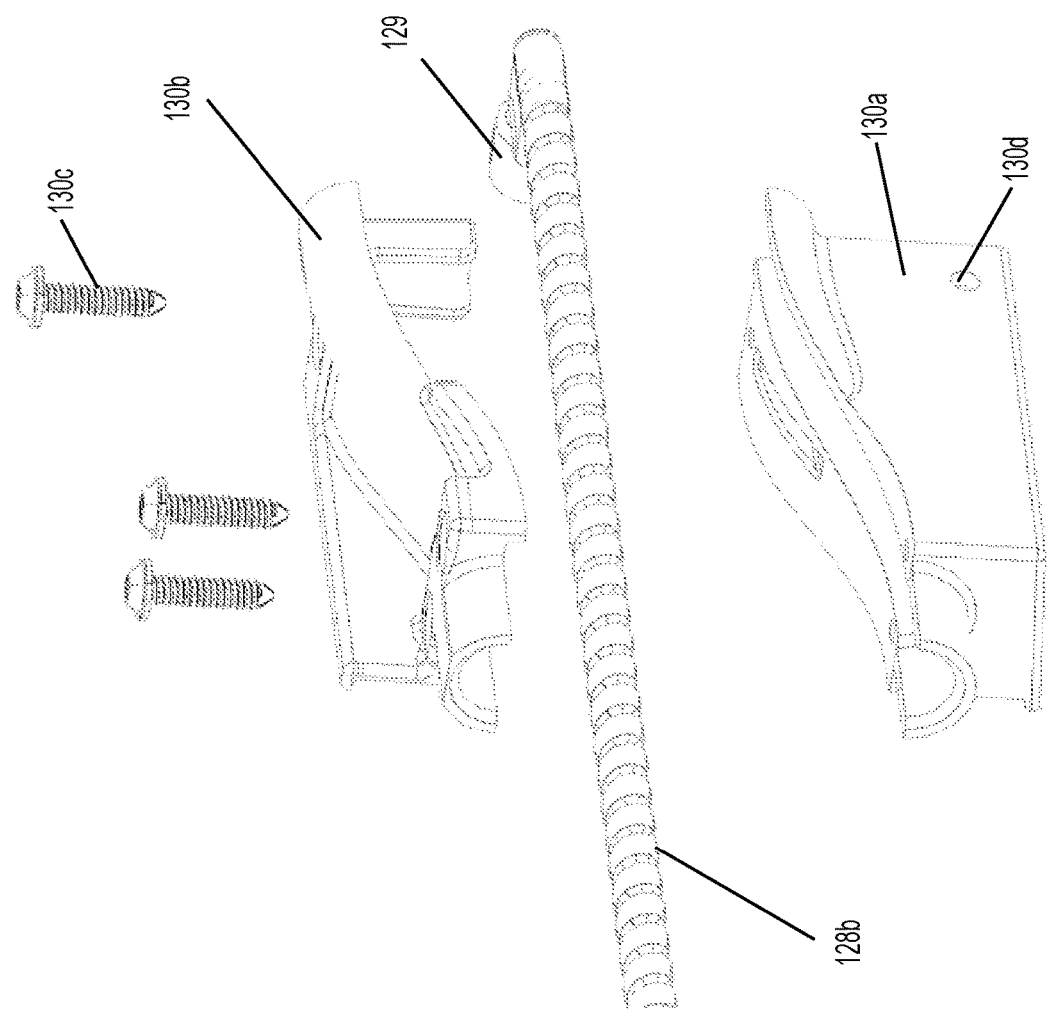
FIG. 9 is an exploded perspective view of the end stop and cable guide of FIG. 8.
Figure 10:
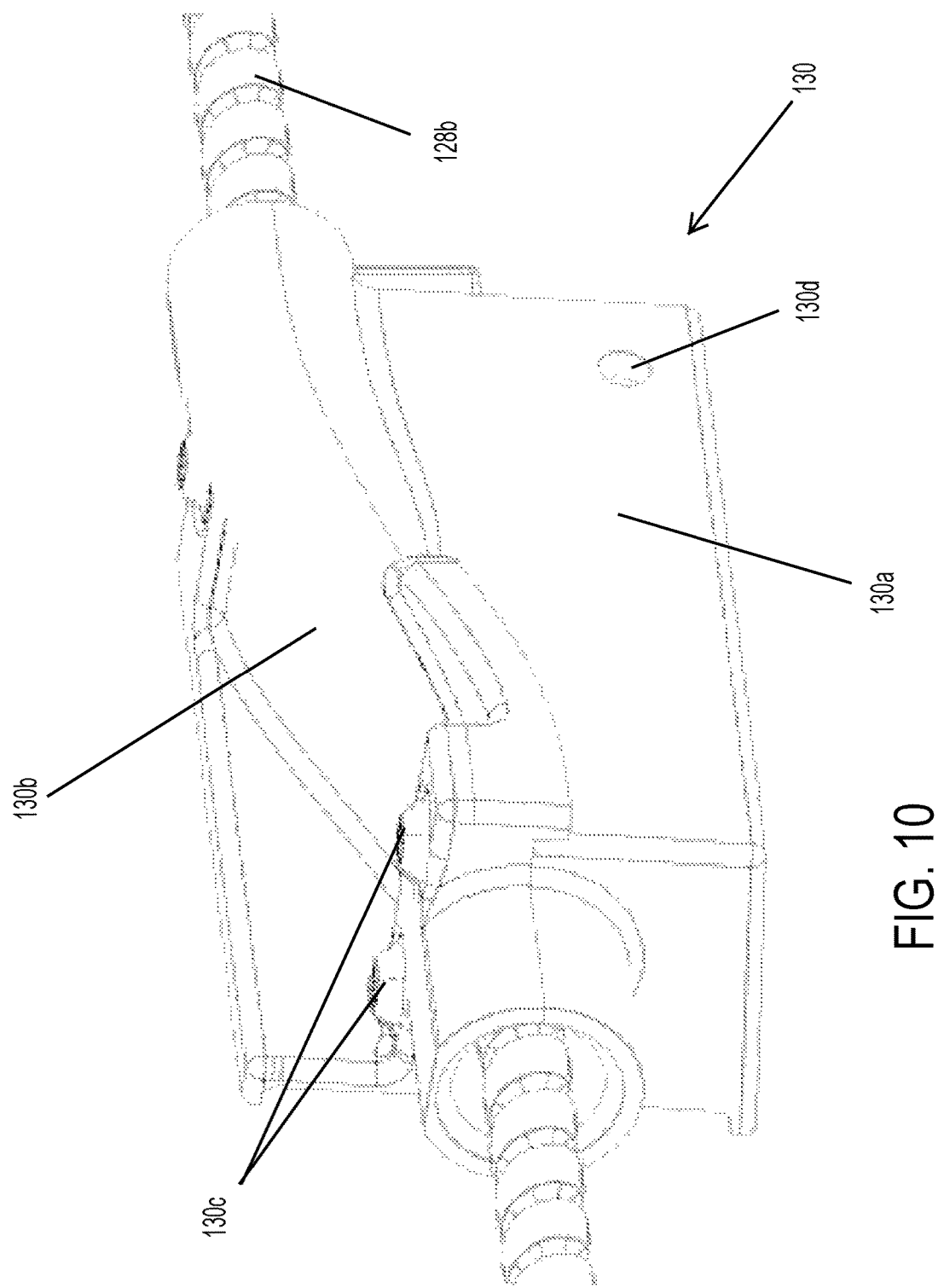
FIG. 10 is a perspective view of the end stop and cable guide of FIG. 9.
Figure 12:
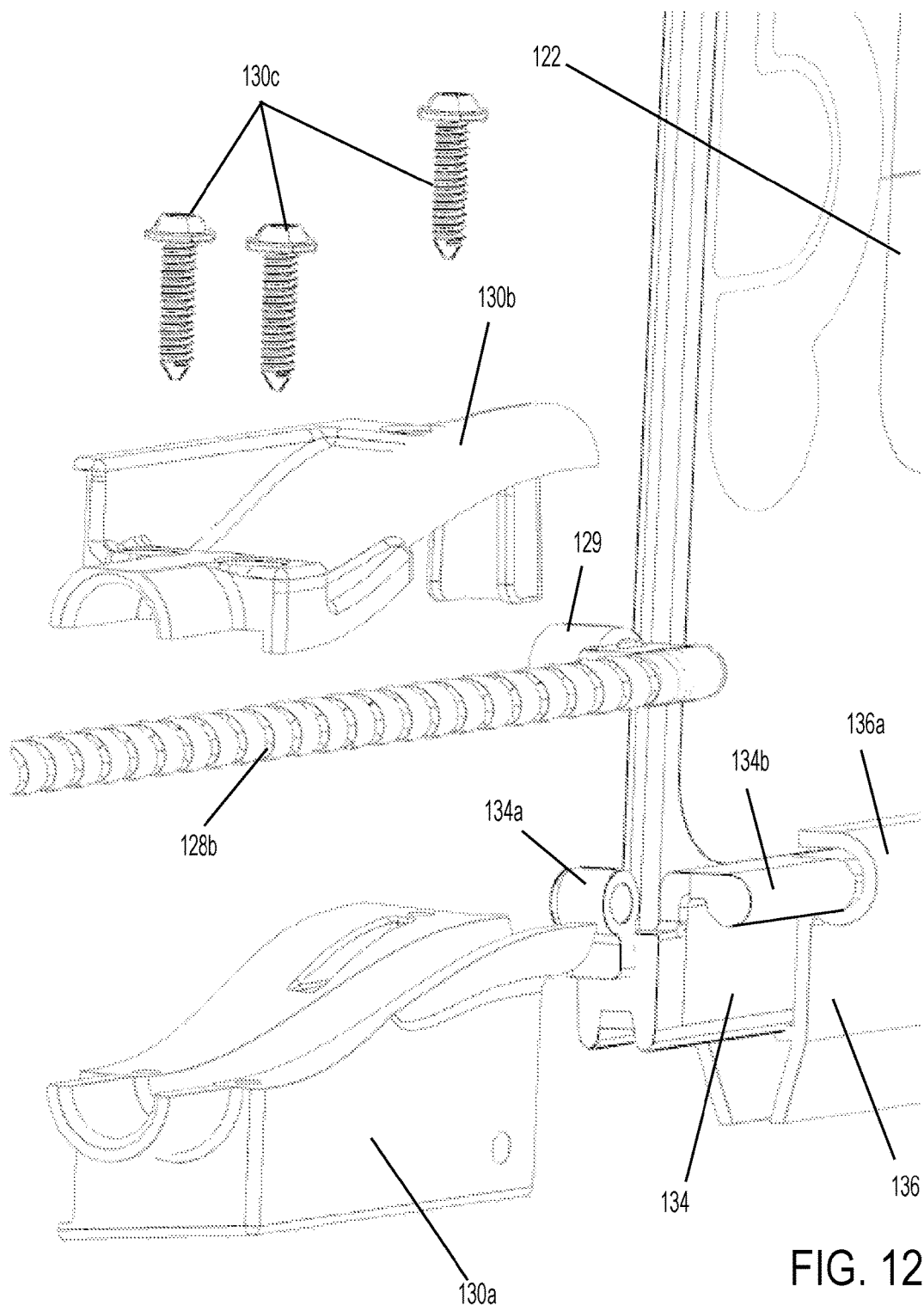
FIG. 12 is another exploded perspective view of the end stop and cable guide and movable window panel of the rear slider window assembly.
Figure 13:
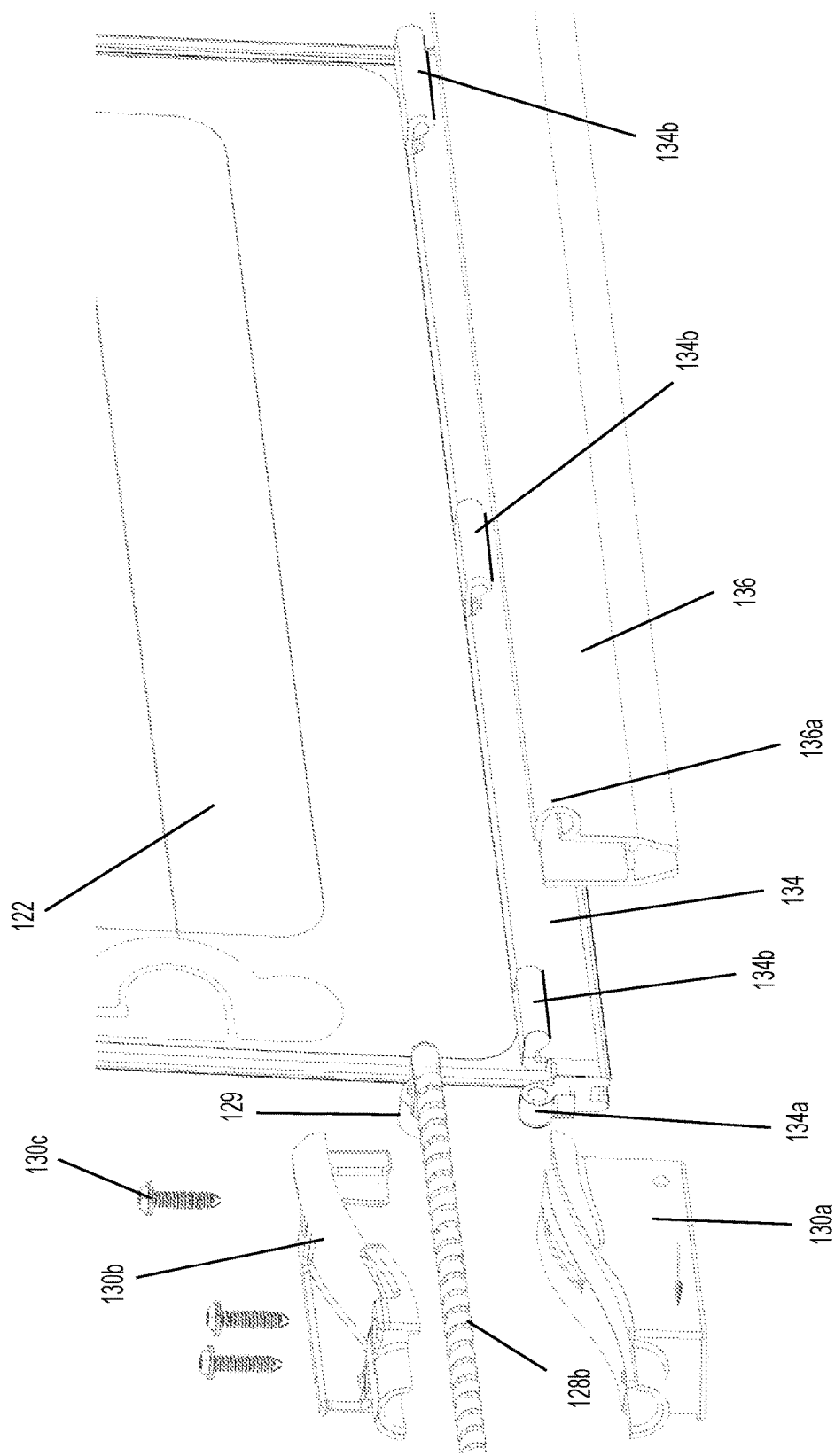
FIG. 13 is another exploded perspective view of the end stop and cable guide and movable window panel and channel of the rear slider window assembly.

In the illustrated embodiment, and as best shown in FIGS. 8, 12 and 13, the lower rail 114 receives a channel element 136 therein (such as a metallic channel element configured to be disposed in the plastic rail), with the channel element being configured to slidably receive the carrier 134. The carrier 134 includes cylindrical guide elements 134b that are configured to be slidably received in a generally cylindrical guide portion or receiving portion 136a of the channel element 136 when the carrier is received in and moved along the channel element 136 and lower rail 114. The receiving portion 136a also receives the helical element therein as the helical element is moved (via the drive motor) to move the respective movable window panel along the channel element and rail and relative to the connectors or guide portions 130 at the ends of the rail 114. Optionally, and as can be seen with reference to FIG. 10, the connector 130 may be formed to guide the helical element so that the helical element may curve within the connector to align the helical element with the receiving portion 136a of the channel portion 136.

Figure 14:
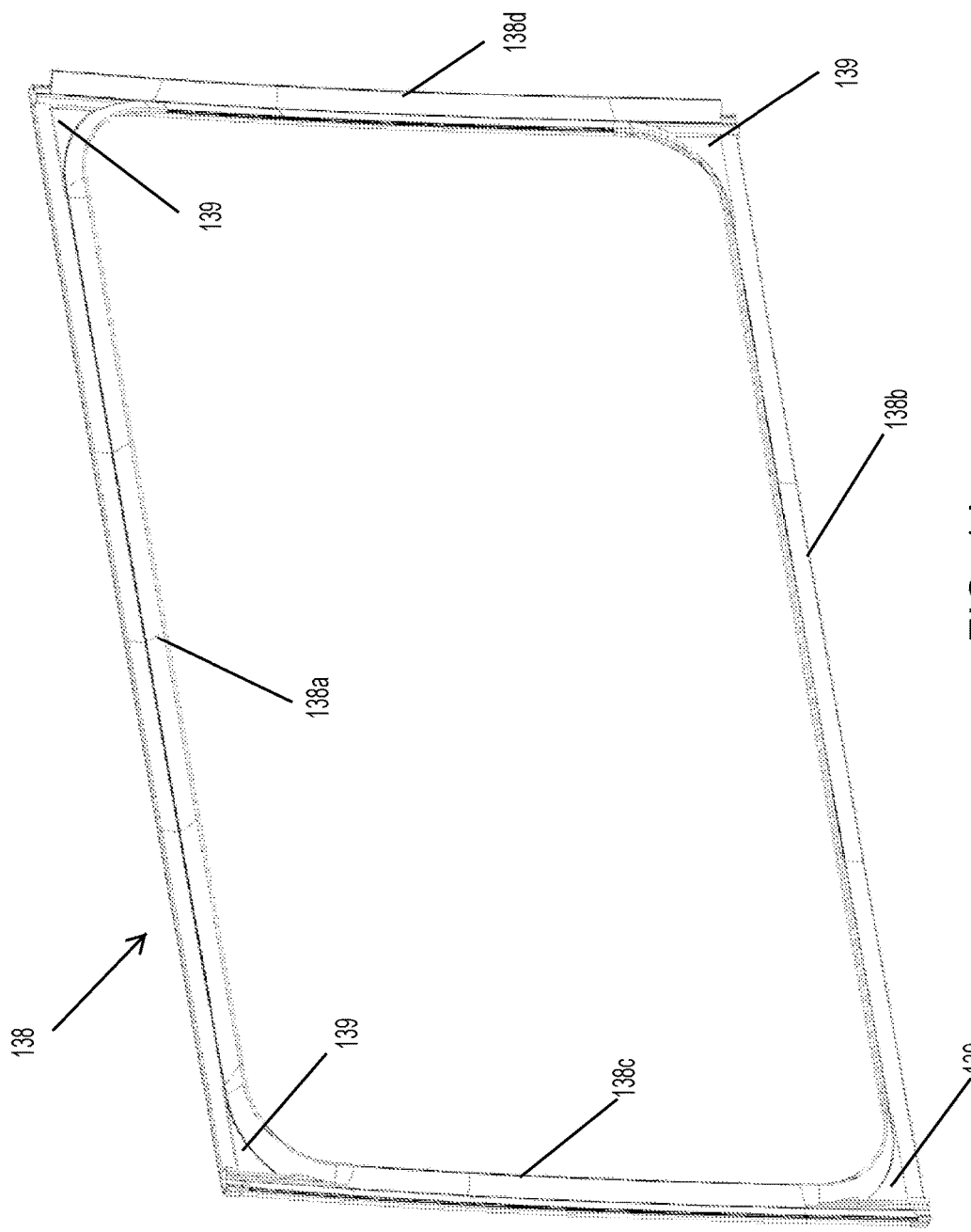
FIG. 14 is a perspective view of a sealing element configured to be disposed about the opening of the fixed window panel of the rear slider window assembly.
Figure 15:
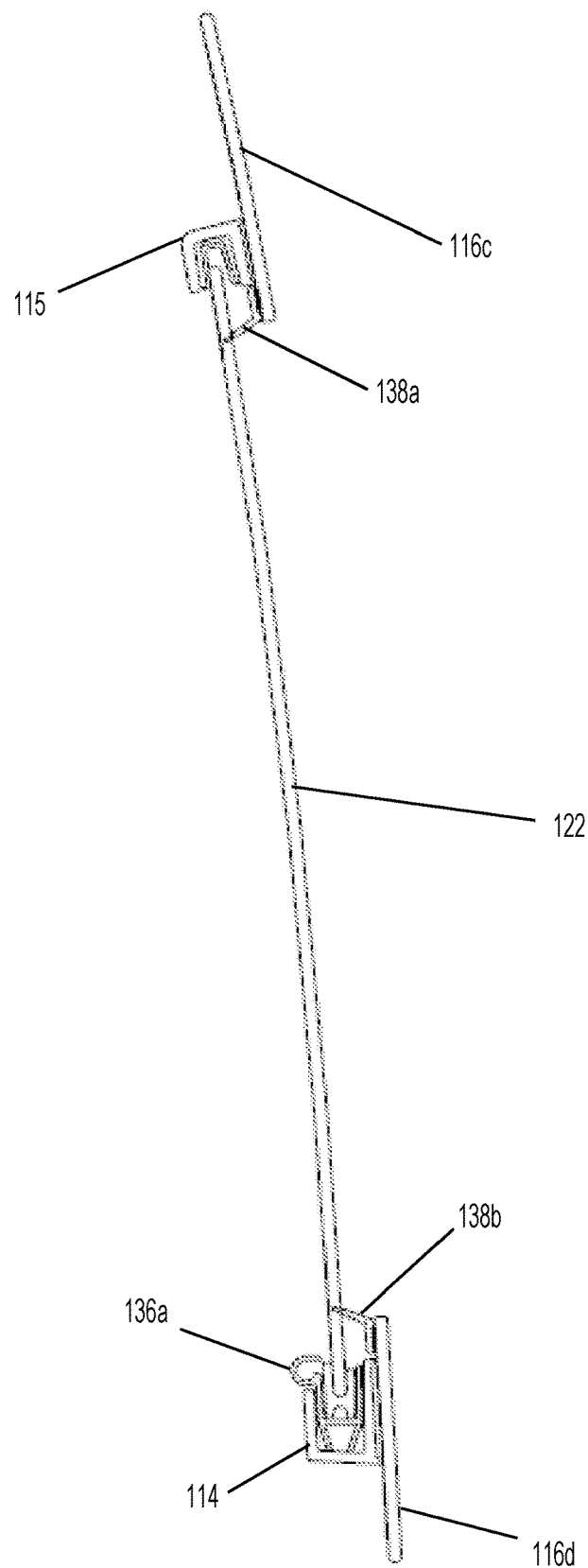
FIG. 15 is a sectional view taken along the line XV-XV in FIG. 7.

Thus, the helical drive elements, when driven via the rotating drive motor, move through the connectors 130 and longitudinally along the channel portion 136 (within the guide or receiving portion 136a) to open and close the respective movable window panel. As can be seen with reference to FIGS. 6, 7, 15 and 16, the movable window panels move along the channels and rails at and along the inner surface of the fixed window panel. The fixed window panel includes a sealing element or perimeter seal 138 (FIG. 14) that is attached at (such as via a tape or adhesive) the inner surface of the fixed window panel so as to circumscribe the opening or aperture 117 formed through the window panel.

In the illustrated embodiment, the sealing element 138 comprises a rectangular element that has generally horizontal sliding lip sealing portions 138a, 138b extending along the upper portion 115a and the lower portion 115b of the window panel (above and below the aperture 117) and generally vertical Y-shaped sealing portions 138c, 138d disposed at the right and left sides of the aperture 117. The sealing element may be unitarily formed via extruding the elongated lip portions 138a, 138b, 138c, 138d and overmolding and/or attaching corner connecting regions 139 at respective adjacent ends of the lip portions, such as by utilizing aspects of the sealing elements described in U.S. Pat. No. 9,475,364, which is hereby incorporated herein by reference in its entirety. Thus, the sealing element 138 provides a seal against each of the movable window panels and provides a continuous seal against the movable window panels and about the aperture when the movable window panels are closed.

With reference to FIGS. 16 and 16A, a center sealing element 140 is provided to seal between and against the inner end regions 120a, 122a of the movable window panels 120, 122 when the movable window panels are closed. In the illustrated embodiment, the center sealing element 140 has an attaching portion 140a that is adhered or bonded or overmolded at the end region 120a of window panel 120 and a receiving portion 140b that is configured to receive the end region 122a of window panel 122 therein when the movable window panels are closed. The center sealing element 140 comprises a compressible material so as to compress and seal against the movable window panel 122 (with the sealing element being sealed against the movable window panel 120 via overmolding or adhesive or the like) when the windows are closed, and thus provides a watertight seal between the closed and abutting window panels.

Thus, the present invention provides a rear slider window assembly with a pair of movable window panels that are moved along rails between opened and closed positions relative to a fixed window panel and aperture or opening formed through the fixed window panel. The rails may guide the movable panels along the rear of the fixed window panel so that the movable window panels are behind the fixed panel when in the closed position (and engaging a sealing element that circumscribes the opening of the fixed window panel, such as a sealing element of the type described in U.S. Pat. No. 9,475,364, incorporated above), or optionally the rails may guide pins of a carrier or frame along the fixed panel and towards the fixed panel such that the movable window panels are moved into the opening when closed so as to provide a generally flush window surface when closed (such as by utilizing aspects of the window assemblies described in U.S. Pat. No. 8,881,458, which is hereby incorporated herein by reference in its entirety).

Optionally, the window assembly or assemblies of the present invention may utilize aspects of the window assemblies described in U.S. Pat. Nos. 8,915,018; 8,402,695; 8,322,073; 7,838,115; 7,073,293; 7,003,916; 6,846,039; 6,691,464; 6,068,719 and/or 5,853,895, and/or U.S. Publication Nos. US-2011-0056140; US-2006-0107600; US-2008-0127563 US-2004-0020131; US-2003-0213179, which are hereby incorporated herein by reference in their entireties. Optionally, the drive motor assembly may utilize aspects of the drive assemblies of the types described in U.S. Pat. Nos. 4,920,698; 4,995,195; 5,146,712; 5,531,046; 5,572,376; 6,119,401; 6,955,009 and/or 7,073,293, and/or U.S. Publication Nos. US-2004-0020131 and/or US-2008-0127563, which are all hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A rear slider window assembly for a vehicle, said rear slider window assembly comprising:

an upper rail and a lower rail;
a fixed window panel comprising at least one glass panel having an inner surface and an outer surface and an opening between opposite side panel portions of said fixed window panel;
wherein said upper rail is attached at said inner surface of said fixed window panel at an upper region of said fixed window panel and above said opening;
wherein said lower rail is attached at said inner surface of said fixed window panel at a lower region of said fixed window panel and below said opening;
first and second movable window panels that are movable along said upper and lower rails, wherein said movable window panels are movable between a closed position, where said first and second movable window panels cooperate to close the opening, and an opened position, where said first and second movable panels move away from one another to open the opening;
wherein said first and second movable window panels are movable via a drive system;
wherein said drive system comprises a drive motor that moves said first and second movable window panels in tandem;
wherein said drive motor rotatably drives a gear element that engages first and second drive elements that are connected to said first and second movable window panels, respectively, and wherein rotation of said gear element imparts movement of said first and second drive elements and said first and second movable window panels;
wherein said first drive element is routed through a first guide element at a first end of said lower rail and an end of said first drive element is attached at an outer end of a carrier of said first movable window panel, and wherein said second drive element is routed through a second guide element at a second end of said lower rail and an end of said second drive element is attached at an outer end of a carrier of said second movable window panel; and
wherein said carrier of said first movable window panel is movable along a channel portion of said lower rail, and wherein said first drive element is received in a receiving element disposed along said channel portion, and wherein said carrier of said second movable window panel is movable along said channel portion of said lower rail, and wherein said second drive element is received in said receiving element disposed along said channel portion.

2. The rear slider window assembly of claim 1, wherein said first guide element comprises a passageway through which said first drive element passes so as to be aligned with said receiving element of said channel portion, and wherein said second guide element comprises a passageway through which said second drive element passes so as to be aligned with said receiving element of said channel portion.

3. The rear slider window assembly of claim 1, wherein said carrier of said first movable window panel includes at least one protrusion that is received in said receiving element of said channel portion, and wherein said carrier of said second movable window panel includes at least one protrusion that is received in said receiving element of said channel portion.

4. The rear slider window assembly of claim 1, wherein said first and second drive elements comprise first and second helical drive elements having a respective helical groove established therealong.

5. The rear slider window assembly of claim 1, comprising a perimeter sealing element that is attached at said fixed window panel and that circumscribes said opening, said perimeter sealing element sealing against a surface of said first and second movable window panels.

6. The rear slider window assembly of claim 5, wherein said perimeter sealing element comprises horizontal lip seals and vertical Y-shaped seals.

7. The rear slider window assembly of claim 1, comprising a center sealing element attached at an inner edge of said first movable window panel that opposes an inner edge of said second movable window panel, wherein said center sealing element is configured to receive an inner edge of said second movable window panel to seal said first and second movable window panels relative to one another when said first and second movable window panels are in the closed position.

8. The rear slider window assembly of claim 1, wherein said fixed window panel comprises a single glass panel having said opening therethrough that is between said opposite side panel portions of said single glass panel.

9. The rear slider window assembly of claim 1, wherein said fixed window panel comprises a pair of opposite side panels that are spaced apart so that said opening is between said side panels.

10. A rear slider window assembly for a vehicle, said rear slider window assembly comprising:
an upper rail and a lower rail;
a fixed window panel comprising a glass panel having an inner surface and an outer surface and an opening between opposite side panel portions of said fixed window panel;
a perimeter sealing element that is attached at said inner surface of said fixed window panel and that circumscribes said opening;
wherein said upper rail is attached at said inner surface of said fixed window panel at an upper region of said fixed window panel and above said opening;
wherein said lower rail is attached at said inner surface of said fixed window panel at a lower region of said fixed window panel and below said opening;
first and second movable window panels that are movable along said upper and lower rails, wherein said movable window panels are movable between a closed position, where said first and second movable window panels cooperate to close the opening, and an opened position, where said first and second movable panels move away from one another to open the opening;
wherein said perimeter sealing element sealing against an outer surface of said first and second movable window panels;
wherein said first and second movable window panels are movable via a drive system, and wherein said drive system comprises a drive motor that moves said first and second movable window panels in tandem;
wherein said drive motor rotatably drives a gear element that engages first and second drive elements that are connected to said first and second movable window panels, respectively, and wherein rotation of said gear element imparts movement of said first and second drive elements and said first and second movable window panels;
wherein, responsive to said drive motor driving said gear element in a first direction, said first and second drive elements are moved so as to pull at said first and second movable window panels, respectively, to open the opening, and wherein, responsive to said drive motor driving said gear element in a second direction opposite the first direction, said first and second drive elements are moved to push at said first and second movable window panels, respectively, to close the opening;

wherein said first drive element is routed through a first guide element at a first end of said lower rail and an end of said first drive element is attached at an outer end of a carrier of said first movable window panel, and wherein said second drive element is routed through a second guide element at a second end of said lower rail and an end of said second drive element is attached at an outer end of a carrier of said second movable window panel; and wherein said carrier of said first movable window panel is movable along a channel portion of said lower rail, and wherein said first drive element is received in a receiving element disposed along said channel portion, and wherein said carrier of said second movable window panel is movable along said channel portion of said lower rail, and wherein said second drive element is received in said receiving element disposed along said channel portion.

11. The rear slider window assembly of claim 10, wherein said first guide element comprises a passageway through which said first drive element passes so as to be aligned with said receiving element of said channel portion, and wherein said second guide element comprises a passageway through which said second drive element passes so as to be aligned with said receiving element of said channel portion.

12. The rear slider window assembly of claim 10, wherein said carrier of said first movable window panel includes at least one protrusion that is received in said receiving element of said channel portion, and wherein said carrier of said second movable window panel includes at least one protrusion that is received in said receiving element of said channel portion.

13. The rear slider window assembly of claim 10, wherein said first and second drive elements comprise first and second helical drive elements having a respective helical groove established therealong.

14. The rear slider window assembly of claim 10, wherein said perimeter sealing element comprises horizontal lip seals and vertical Y-shaped seals.

15. The rear slider window assembly of claim 10, comprising a center sealing element attached at an inner edge of said first movable window panel that opposes an inner edge of said second movable window panel, wherein said center sealing element is configured to receive an inner edge of said second movable window panel to seal said first and second movable window panels relative to one another when said first and second movable window panels are in the closed position.

* * * * *